Nov. 22, 1960  SHO TAKAHAMA  2,960,922
FLASH SYNCHRONIZING DEVICE FOR CAMERAS
Filed March 23, 1959
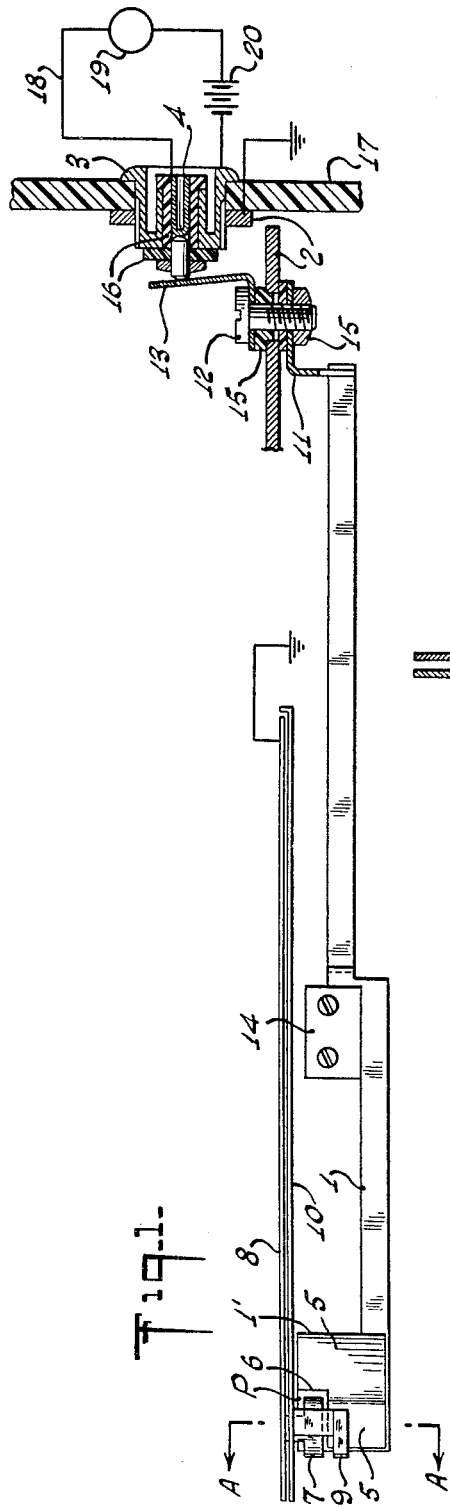
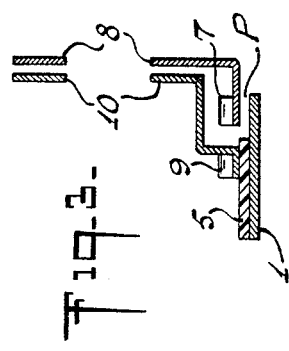
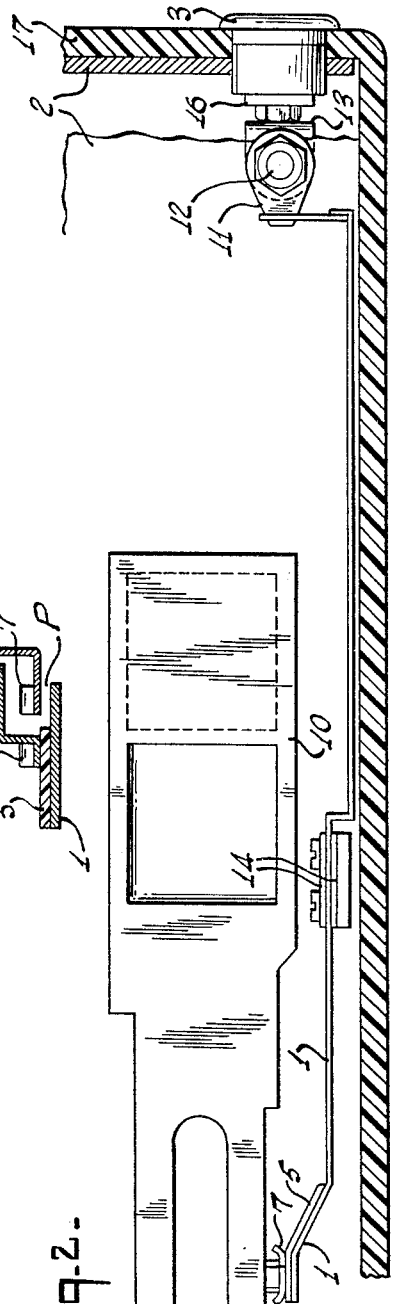
INVENTOR
SHO TAKAHAMA
BY
ATTORNEY

2,960,922
FLASH SYNCHRONIZING DEVICE FOR CAMERAS

Sho Takahama, Nishinomiya-shi, Japan, assignor to Yashica Co., Ltd., Tokyo, Japan, and Kabushiki Kaisha Konan Kamera Kenkyu-Jo, Hyogo-ken, Japan, both corporations of Japan Filed Mar. 23, 1959, Ser. No. 801,289

9 Claims. (Cl. 95—11.5)

The present invention relates to a flash synchronizing device for cameras and particularly to such a switching device which will be in the closed condition only during an interval of the shutter actuating cycle.

Flash switching devices in current use have the difficulty that some of them which are associated directly with the shutter release button for actuation require a second means to interrupt the circuit. Others, even in some of the most expensive cameras, remain actuated or are reactuated as the shutter is rewound and therefore make it impossible to insert a fresh flash bulb before the shutter is rewound. In view of the fact that in most cameras it is not desirable to keep the shutter in a wound state, this is a distinct disadvantage.

It is a primary purpose of the present invention to provide a simple and yet effective mechanism for actuating a flash synchronizing circuit only during an interval of the shutter actuating cycle and to insure that the said circuit shall remain open at all other times.

The above and other objects are achieved in the preferred embodiment of the present invention here described by providing an electrical connector accessible to the outside of the camera body, the outer portion of which is grounded to the camera frame and the central pin of which is connected to an elongated resilient member which is disposed in part beneath the shutter plates from which there depend parallel wipers, the member having at its end proximate said wipers a raised insulated portion and a relatively depressed non-insulated portion, the height of the wipers being such that the first of the same to arrive may contact the non-insulated portion of said member, thus closing the flash circuit through the shutter which in turn is connected to the frame of the case and yet permits such wiper to be disconnected from such non-insulated portion by the later arrival of the second wiper at the same height but which contacts the insulated portion of said member, thus depressing it and breaking the contact with the first mentioned wiper.

Other objects and a fuller understanding of the present invention may be had by referring to the following detailed description and claims, taken in conjunction with the accompanying drawing which illustrates the preferred embodiment thereof, it being understood that the foregoing statement of the objects of the invention and the brief summary thereof is intended to generally explain the same without limiting it in any manner.

Fig. 1 is a plan view of the members comprising a flash synchronizing circuit, portions thereof being shown in section, embodying the present invention incorporated within a camera body, together with a schematic of the flash bulb circuit.

Fig. 2 is an elevational view thereof.

Fig. 3 is a sectional view taken along the line A—A of Fig. 1.

Referring now to the drawing, the preferred form of the invention there illustrated consists of a camera housing 17 of insulated material, within which there is placed a camera frame 2 of electrically conductive material, a conventional connector 3 comprising an outer case of electrically conductive material in the form roughly of a cylinder having an axially parallel groove cut in the walls thereof in communication with the outer end surface thereof (to the right in Fig. 1) and having mounted therein an axially located hollow connector pin 4 surrounded by insulating material 16. An elongated resilient contact arm of electrically conductive material is mounted to an intermediate wall of frame 2 by means of a screw 12 which bears a connecting finger 13 in contact with central pin 4 of connector 3, there being insulating material 15 between said finger 13 and a connector 11, which in turn is secured to contact arm 1. Toward the free end of contact arm 1 it is bent so as to form an upwardly inclined portion and is then bent again at its very end to provide a flat platform which extends parallel to the bottom of camera body 17.

Said inclined and platform portions are covered with an insulated plate 5 except for a contact portion P, where a corner 6 of said insulated plate 5 is cut away (at the rear of the platform portion of said contact arm 1), the same being shown at the top of said portion in Fig. 1.

Focal plane shutter plates 8 and 10, which may be a part of the type of shutter more fully and completely described in my copending application filed simultaneously herewith, Serial No. 801,290, entitled Shutter for Photographic Cameras, are mounted within camera housing 17 so that wipers 7 and 9 depending respectively from plates 8 and 10 are positioned over the inclined and platform portions of contact arm 1, wiper 7 consisting of an inbent lower portion of said shutter turned up at the ends, overlying contact portion P of the platform of contact arm 1 in the uncocked or unset position of said shutter plate, and wiper 9, consisting of a doubly bent portion of shutter plate 10, lies turned up at its ends overlying insulated plate 5 at said platform portion of contact arm 1 in the uncocked or unset position of shutter plate 10. Shutter plate 8 is connected to ground (which in this case may be the camera frame 2 as illustrated in the drawing, or which may be a separate ground reference).

The outside flash circuit is illustrated diagrammatically in Fig. 1, there being shown flash bulb 19 connected at one end to the positive terminal of battery 20 and at the other to a cable 18 which is connected to the central pin 4 of connector 3, while the negative side of terminal battery 20 is connected through a cable connection to the outer shell of connector 3 and through it to frame 2 or ground.

As the shutter is cocked by the displacement of shutter plates 8 and 10 toward the right (in Figs. 1 and 2) and towards the viewer (in Fig. 3) both wipers 7 and 9, the bottom surfaces of which are parallel, are withdrawn from position over the platform and the inclined portions of contact arm 1. As the shutter is actuated, the first of the plates to travel to the left (in Figs. 1 and 2) and away from the viewer (in Fig. 3) is plate 8, which first strikes the inclined portion of contact arm 1 and then slides over to the contact portion P. At this instant flash bulb 19 would be fired since the circuit through said flash bulb and battery would be completed, there being true electrical connection established through the following elements: from the negative terminal battery to the shell of connector 3 to frame 2, which may be considered ground, through ground to shutter plate 8, through wiper 7, to contact portion P and the balance of connector arm 1, through connector 11, screw 12, finger 13 and central pin 4 back through cable 18 to flash bulb 19. However, when shutter plate 10 arrives somewhat later, wiper 9 contacts first the inclined portion and then the platform portion of contact arm 1, but since it rests upon insulated plate 5 it acts to depress contact arm 1 a distance equal to the thickness of insulated plate 5 and thus breaks the contact between wiper 7 and contact portion P. When the shutter is rewound or reset or recocked and shutter plates 8 and 10 are started along their paths to the right (in Figs. 1 and 2) there is no contact between wiper 7 and contact portion P since plates 8 and 10 move together and since wiper 9 continues to ride along insulated plate 5 keeping contact arm 1 depressed until both wipers 7 and 9 travel together along the insulated inclined portion of contact arm 1. Insulated portions 14 affixed to an intermediate part of contact arm 1 may be used in connection with a boss extending from the bottom of the housing as a detent for such arm.

The device thus described, while extremely simple, is nevertheless quite reliable and produces the advantage of closing a flash circuit only during the portion of the actuation cycle of the shutter.

Although the present invention has been described with a certain degree of particularity, it is understood that the present disclosure has been made only by way of example and that numerous variations may be employed without transcending the scope of the invention as hereinafter claimed.

What is claimed is:

1. A camera flash synchronizing mechanism comprising first and second cooperating shutter members concurrently movable from an advanced uncocked to a retracted cocked position, and sequentially movable from a cocked to an uncocked position wherein said first shutter member precedes said second shutter member, first and second terminal members, a first contact defining abutment element carried by and movable with said first shutter member along a first longitudinal path between an advanced and a retracted position and electrically connected to said first terminal member, a second circuit breaking abutment element transversely spaced from said first abutment element and carried by and movable with said second shutter member between an advanced and a retracted position along a path substantially parallel to said first path, a second contact element normally located in the path of said first contact defining abutment element and means actuated by said second abutment element upon said movement to a retracted position to urge said second contact element out of the path of said first contact abutment element.

2. A camera flash synchronizing mechanism in accordance with claim 1 wherein said first and second contact elements are in registering alignment when said first shutter member is in uncocked position.

3. A camera flash synchronizing mechanism in accordance with claim 1 wherein said second contact element is out of the path of said first contact element when said second shutter member is in uncocked position.

4. A camera flash synchronizing mechanism comprising first and second cooperating shutter members concurrently movable from an uncocked to a cocked position and sequentially movable from a cocked to an uncocked position wherein said first shutter member precedes said second shutter member, first and second terminal members, a first contact defining abutment element carried by and movable with said first shutter member and electrically connected to said first terminal, a second circuit breaking abutment element carried by and movable with said second shutter member, a cantilevered arm having a free end resiliently movable in a direction towards and away from the path of movement of said abutment elements, a second contact element located on and adjacent to the free end of said arm and electrically connected to said second terminal and normally located in the path of said first contact defining abutment element and a third abutment element located on said arm adjacent to said second contact and in the path of said second abutment element, said second contact element being out of the path of said first contact element when said second and third abutment elements are in engagement.

5. A camera flash synchronizing mechanism in accordance with claim 4 wherein said first and second abutment elements are transversely spaced and are in substantially transverse alignment when said shutter members are in uncocked position, and said first and second contacts are out of engagement and said second and third abutment elements are in engagement.

6. A camera flash synchronizing mechanism in accordance with claim 4 wherein said arm is formed of an electrical conducting material and is connected to said second terminal.

7. A camera flash synchronizing mechanism comprising first and second cooperating shutter members concurrently movable from an uncocked to a cocked position and sequentially movable from a cocked to an uncocked position wherein said first shutter member precedes said second shutter member, first and second terminal members, a first contact defining abutment element carried by and movable with said first shutter member along a first longitudinal path and electrically connected to said first terminal member, a second circuit breaking abutment element transversely spaced from said first abutment element and carried by and movable with said second shutter member along a second longitudinal path which is substantially parallel to said first path, a cantilevered resilient metal arm having a free end offset relative to the inner end of said arm and defining a longitudinally extending platform normally located in said first and second abutment paths, said arm being connected to said second terminal member, and a layer of electrical insulating material located on said platform along that portion thereof in alignment with the path of said second abutment element, the other portion of said platform being out of the path of said first abutment element when said platform is engaged by said second abutment element.

8. A camera flash synchronizing mechanism in accordance with claim 7 where said platform is connected to the inner end of said arm by an inclined leg.

9. A camera flash synchronizing mechanism in accordance with claim 7 wherein said first contact defining abutment element is in alignment and out of engagement with said platform and said second abutment element is in engagement with said platform when said shutter members are in uncocked position.

References Cited in the file of this patent
UNITED STATES PATENTS

| | | |
|---|---|---|
| 2,279,477 | Mihalyi | Apr. 14, 1942 |
| 2,498,277 | Kaplowitz | Feb. 21, 1950 |

UNITED STATES PATENT OFFICE
CERTIFICATION OF CORRECTION

Patent No. 2,960,922　　　　　　　　　　　November 22, 1960

Sho Takahama

It is hereby certified that error appears in the above numbered patent requiring correction and that the said Letters Patent should read as corrected below.

In the grant (only), line 13, for "Yasguca Co., Ltd." read -- Yashica Co., Ltd. --.

Signed and sealed this 2nd day of May 1961.

(SEAL)
Attest:

ERNEST W. SWIDER
Attesting Officer

DAVID L. LADD
Commissioner of Patents